Feb. 21, 1956 R. E. GAGNON 2,735,357
COOKING APPARATUS TURNOVER DEVICE
Filed Dec. 10, 1951 2 Sheets-Sheet 1

INVENTOR
ROBERT EDMUND GAGNON
BY
Fetherstonhaugh & Co.
ATTORNEYS

Feb. 21, 1956  R. E. GAGNON  2,735,357
COOKING APPARATUS TURNOVER DEVICE
Filed Dec. 10, 1951  2 Sheets-Sheet 2

INVENTOR
ROBERT EDMUND GAGNON
BY
Featherstonhaugh & Co.
ATTORNEYS

United States Patent Office 2,735,357
Patented Feb. 21, 1956

2,735,357
COOKING APPARATUS TURNOVER DEVICE

Robert Edmund Gagnon, Vancouver, British Columbia, Canada, assignor of one-third to Paul Vance Gagnon, and one-third to Marcel Alphonse Gagnon, both of Vancouver, British Columbia, Canada Application December 10, 1951, Serial No. 260,862

13 Claims. (Cl. 99—409)

This invention relates to devices for turning over doughnuts and other food products in cooking apparatus.

Foods, such as doughnuts, are cooked by floating them in a vessel containing hot deep fat known in the trade as liquor. Most of the present devices for cooking in this manner have a framework associated with the vessel to form a series of cells, each of which prevents a doughnut from freely moving around in the liquor. A rotating arm is also provided to flip each doughnut over in its cell in order that the opposite side of said doughnut may be cooked.

The present invention eliminates the necessity of having a complicated framework or cell arrangement for positioning a doughnut while it is being turned over by my mechanical means. According to this invention, the doughnuts float freely in the cooking liquor and the turnover device creates a current which draws them towards one side thereof in order that it may pull them beneath the surface of the liquor and release them in the inverted position on its opposite side.

This turnover device comprises a drum rotatably mounted adjacent the surface of the liquor upon which the doughnuts float, means for rotating the drum, said drum being mounted so that at least part of it is moved into and out of the liquor as it is rotated, a shoulder on the drum extending longitudinally thereof and outwardly from its centre of rotation, and a slot in the drum near the inner edge of the shoulder ahead of the latter relative to the direction of rotation of the drum.

Figure 1:
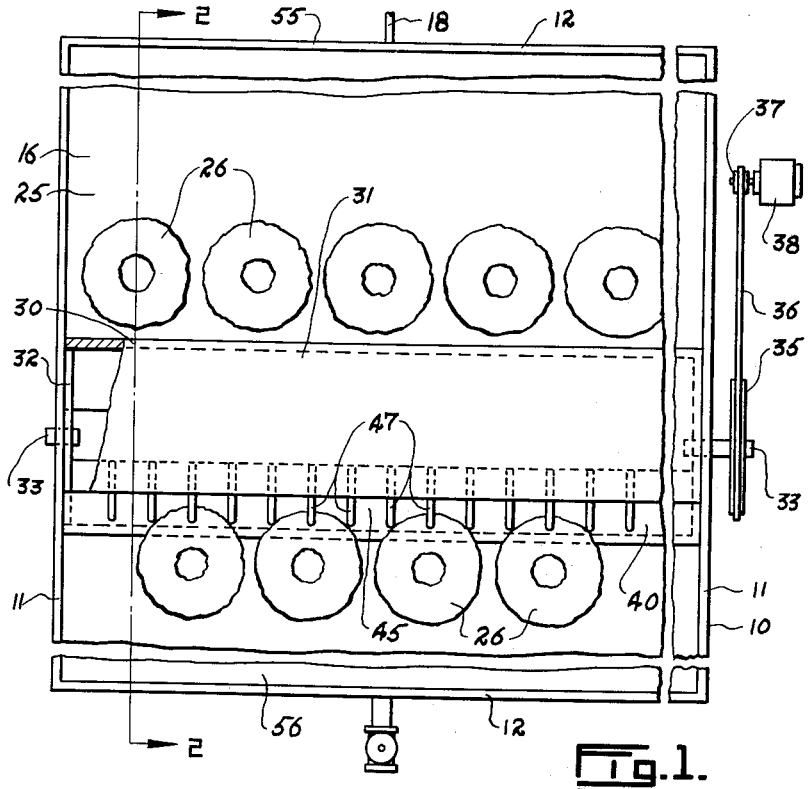
Figure 2:
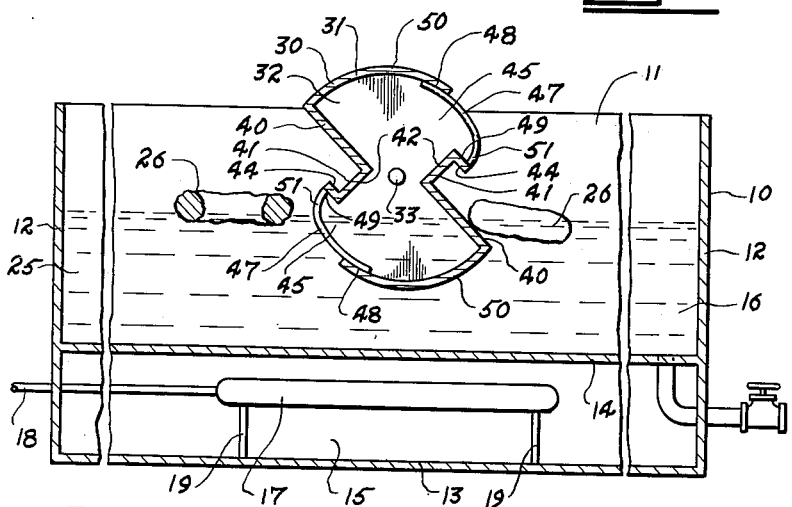
Figure 3:
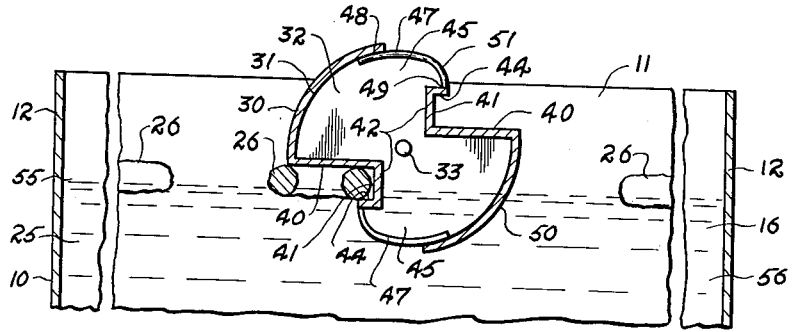
Figure 4:
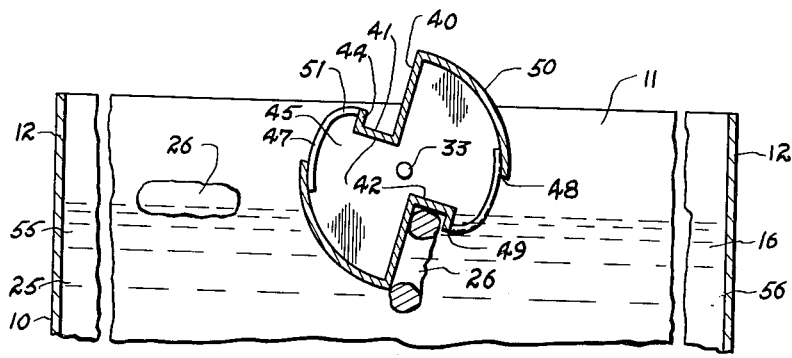
Figure 5:
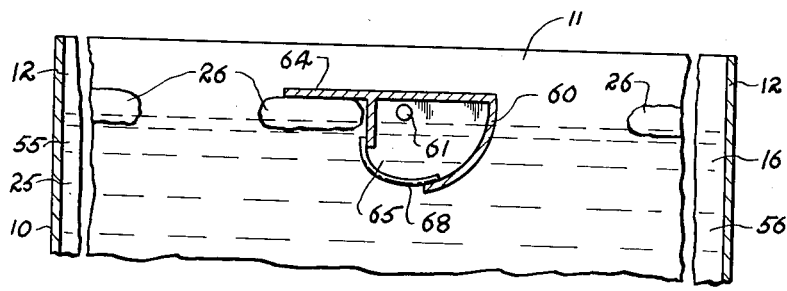

Examples of this invention are illustrated in the accompanying drawings in which, Figure 1 is a plan view of cooking apparatus including one form of turnover device, Figure 2 is a sectional view taken on the line 2—2 of Figure 1 showing the first stage of the operation, Figure 3 is similar to Figure 2 showing the second stage of the operation, Figure 4 is also similar to Figure 2 illustrating the third stage of the operation, and Figure 5 is a view similar to Figure 3 illustrating an alternative form of the turnover device.

Referring to the drawings, 10 is a cooking vessel usually rectangular in shape having a pair of side walls 11, a pair of end walls 12, and a bottom 13. It is desirable to provide a secondary bottom 14 above the bottom 13 to divide the vessel into a lower chamber 15 and an upper chamber 16. A gas burner 17 or other suitable heating unit is located in the lower chamber and has a supply line 18 extending through one of the side walls 11. The burner may be supported above the bottom 13 on legs 19.

A cooking liquor, such as fat 25, is located in the upper chamber 16 and brought to the correct temperature for cooking doughnuts 26 or any other desired food by the burner 17.

A turnover device 30 is partially submerged in the cooking vessel near the centre thereof and is rotatably mounted in its own supports or, as shown, in the side walls of said vessel. This device comprises a hollow substantially cylindrical drum 31 extending across the entire width of the vessel 10 and having a peripheral wall, the greater part of which is solid, said drum having its ends sealed by plates 32. A short shaft 33 is attached to each end plate 32 and extends outwardly thereof, preferably axially of the drum. The free ends of the shafts are journalled in the side walls 11 of the vessel at a height which will keep the drum partially submerged when the liquor 25 is at its normal level or permit at least part of it to be moved into and out of the liquor as it is rotated.

Means is provided for rotating the drum. This may be accomplished by attaching a pulley 35 to the free end of one of the shafts 33 extending beyond a side wall 11, and connecting said pulley by a belt 36 to a pulley 37 mounted on the shaft of a motor 38.

At least one solid shoulder 40 is formed on the drum extending longitudinally thereof and outwardly from its centre of rotation. In this example, shoulders 40 are located in diametrically opposite sides of the drum, see Figure 2. These shoulders are actually formed by recesses 41 in the drum periphery. Each recess has an inner wall or bottom 42 substantially as wide as the thickness of a doughnut. It is desirable that a lip 44 be formed outwardly from the side of each inner wall remote from the adjacent shoulder.

A slot 45 is located in the periphery of the drum extending longitudinally thereof adjacent the lip 44 of each recess 40.

A curved guard having openings therein is located across each of the slots 45 to permit the passage of liquor in the vessel into the drum. The guard may comprise a screen or foraminous plate, but is preferably formed by a series of spaced wires 47 extending across each slot, each wire having one end attached to the periphery of the drum at 48, and its other end attached to a lip 44 at 49. The wires 47 are curved, each wire having substantially the same radius as that of the periphery of the drum at 50, and preferably of a smaller radius than that of the drum periphery at 51 near the lip.

In operation, the liquor 25 in the vessel is heated to the correct cooking temperature by the burner 17 before doughnuts 26 are placed in it at one end 55 thereof, and allowed to float freely. The drum 31 is rotated by the motor 38, or other suitable power source, in an anti-clockwise direction as seen in Figure 2, to move one of the slots 45 below the surface of the liquor. The liquor quickly flows into the submerged section of the drum and creates a current which draws some of the doughnuts into contact with the wires 47. The speed of rotation of the drum is used to control the speed of the surface current and the doughnuts, in order that they will be in the liquor a period long enough to be cooked on one side. The shorter radii of the portions 51 of the wires form bulges therein which move the doughnuts outwardly from beneath the lip 44 to prevent them from being carried under the drum at this time. As the drum continues to rotate, the doughnuts fit into the recess 41 against the shoulder 40, as shown in Figure 3. This shoulder moves the doughnuts under the surface of the liquor to the other end 56 of the vessel. Figures 3, 4 and 2 respectively show how a doughnut is inverted as it is moved through the liquor. After a sufficient period of time the doughnuts may be manually or mechanically removed from the vessel completely cooked on both sides. In the meantime, another group of doughnuts is moved forward into contact with the next set of wires 47 of the drum in exactly the same manner as previously described.

As the slot ahead of each recess 41 moves upwardly out of the liquid, any liquid in the drum runs out through said slot. Thus, the portion of the drum ahead of this slot is empty when it returns to the liquid, see the top portion of the drum in Figures 3 and 4. This drum portion is well submerged in the liquid by the time the slot reaches the latter so that there is a rush of liquid through the slot, creating the current which draws the doughnuts towards the drum and into the recesses thereof at the right time.

An alternate form of the invention is shown in Figure 5. In this alternative, a drum 60 has short shafts 61 at its opposite ends journalled in the side walls 11 of the vessel 10. This drum has one shoulder only which is formed by a plate 64 extending longitudinally and outwardly therefrom substantially radially from its centre of rotation. A slot 65 is formed in the periphery of the drum extending longitudinally thereof with its trailing edge, having regard to the direction of rotation of the drum, spaced approximately the width of a doughnut away from the inner edge of the shoulder plate 64. A curved guard 68 is located across the slot and is preferably similar in shape and construction to the guard of the form of the invention illustrated in Figures 1 to 4.

The turnover device of Figure 5 operates in the same manner as the previously described device. The movement of liquor through the slot 65 draws the doughnuts beneath the shoulder plate 64 which, in turn, moves them through the liquor around the centre of rotation of the drum to invert them and discharge them from the opposite side of the drum.

It can readily be seen that this turnover device provides a simple and efficient arrangement for inverting doughnuts or other fried foods during the cooking process. It does not require any special apparatus to move the doughnuts in the liquor to it, or to hold the doughnuts in any particular position when they are inverted.

What I claim as my invention is:

1. In apparatus for cooking doughnuts and the like in hot liquor, the combination with a cooking vessel containing the liquor, of a turnover device comprising a hollow drum rotatably mounted adjacent the surface of the liquor, said drum having a peripheral wall the greater part of which is solid, means for rotating the drum, said drum being mounted so that at least part of it is moved into and out of the liquor as it is rotated, a shoulder on the drum extending longitudinally thereof and outwardly from its centre of rotation, and a slot in the drum near the inner edge of the shoulder ahead of the latter relative to the direction of rotation of the drum.

2. Apparatus for cooking doughnuts and the like as claimed in claim 1, including a guard having openings therein over the slot.

3. In apparatus for cooking doughnuts and the like in hot liquor, the combination with a cooking vessel containing the liquor, of a turnover device comprising a hollow drum rotatably mounted adjacent the surface of the liquor, said drum having a peripheral wall the greater part of which is solid, means for rotating the drum, said drum being mounted so that at least part of it is moved into and out of the liquor as it is rotated, a recess located in the drum periphery to form a shoulder extending longitudinally thereof and outwardly from its centre of rotation, said shoulder being solid, an inner wall in the recess substantially as wide as the thickness of a doughnut, and a slot in the drum periphery adjacent the side of the inner wall remote from the shoulder.

4. In apparatus for cooking doughnuts and the like in hot liquor, the combination with a cooking vessel containing the liquor, of a turnover device comprising a hollow drum rotatably mounted adjacent the surface of the liquor, said drum having a peripheral wall the greater part of which is solid, means for rotating the drum, said drum being mounted so that at least part of it is moved into and out of the liquor as it is rotated, a recess located in the drum periphery to form a shoulder extending longitudinally thereof and outwardly from its centre of rotation, said shoulder being solid, an inner wall in the recess substantially as wide as the thickness of a doughnut, a lip extending outwardly from the side of the inner wall remote from the shoulder, a slot in the drum periphery adjacent the lip, and a guard having openings therein over the slot.

5. Apparatus for cooking doughnuts and the like as claimed in claim 3, including a guard over the slot, said guard comprising a plurality of spaced curved wires parallel to each other, the curve of each wire being substantially the same as that of the drum throughout part of the wire length and being of a shorter radius at the side of the slot nearest the shoulder.

6. In apparatus for cooking doughnuts and the like in hot liquor, the combination with a cooking vessel containing the liquor, of a turnover device comprising a hollow drum rotatably mounted adjacent the surface of the liquor, said drum having a peripheral wall the greater part of which is solid, means for rotating the drum, said drum being mounted so that at least part of it is moved into and out of the liquor as it is rotated, recesses located in the drum periphery diametrically opposite each other, each forming a shoulder extending longitudinally and outwardly from the centre of rotation of the drum, each of said shoulders being solid, an inner wall in each recess substantially as wide as the thickness of a doughnut, and a slot in the drum periphery adjacent the side of each inner wall remote from its shoulder.

7. In apparatus for cooking doughnuts and the like in hot liquor, the combination with a cooking vessel containing the liquor, of a turnover device comprising a hollow drum rotatably mounted adjacent the surface of the liquor, said drum having a peripheral wall the greater part of which is solid, means for rotating the drum, said drum being mounted so that at least part of it is moved into and out of the liquor as it is rotated, recesses located in the drum periphery diametrically opposite each other, each forming a shoulder extending longitudinally and outwardly from centre of rotation of the drum, each of said shoulders being solid, an inner wall in each recess substantially as wide as the thickness of a doughnut, a lip extending from the side of the inner wall of each recess remote from its shoulder, a slot in the drum periphery adjacent each lip, and a guard over each slot comprising a plurality of spaced curved wires parallel to each other, the curve of each wire being substantially the same as that of the drum throughout part of the wire length and being of shorter radius at the side of the slot nearest the adjacent shoulder.

8. A turnover device for cooking apparatus comprising a hollow drum to be rotated about a longitudinal axis and having a peripheral wall the greater portion of which is solid, a shoulder on and extending longitudinally of the drum and extending inwardly therefrom in a radial direction, an inner wall along the inner end of the shoulder substantially normal thereto and extending to the drum periphery, said shoulder and inner wall forming an unobstructed recess in the drum periphery opening outwardly from the latter, and a slot in the drum periphery extending longitudinally thereof along the outer edge of the inner wall.

9. A turnover device as claimed in claim 8 including a holed guard over the drum slot.

10. A turnover device as claimed in claim 8 including a lip along the side of the inner wall remote from the shoulder extending outwardly substantially parallel with the latter.

11. A turnover device for cooking apparatus comprising a hollow drum to be rotated about a longitudinal axis and having a peripheral wall the greater portion of which is solid, diametrically opposed shoulders on and extending longitudinally of the drum, each extending inwardly therefrom in a radial direction, an inner wall along the inner edge of each shoulder substantially normal thereof and extending towards the drum periphery, each shoulder and inner wall forming an unobstructed recess in the drum periphery opening outwardly from the latter, and a slot in the drum periphery extending longitudinally thereof along the outer edge of each inner wall.

12. A turnover device as claimed in claim 11 including a holed guard over each drum slot.

13. A turnover device as claimed in claim 11 including a lip along the side of each inner wall remote from the shoulder adjacent the latter and extending outwardly substantially parallel with said adjacent shoulder.

References Cited in the file of this patent

UNITED STATES PATENTS

| | | |
|---|---|---|
| 292,075 | Vanduzen | Jan. 15, 1884 |
| 1,904,370 | Hunter | Apr. 18, 1933 |
| 1,965,241 | Hunter | July 3, 1934 |
| 2,201,364 | Carpenter | May 21, 1940 |
| 2,370,792 | Hoffman | Mar. 6, 1945 |
| 2,576,183 | Irvine et al. | Nov. 27, 1951 |